United States Patent Office 3,014,798
Patented Dec. 26, 1961

3,014,798
ALUMINUM SOLDER AND FILLER ALLOY
Clyde E. D. Campbell, Waltham, Mass., assignor, by mesne assignments, to the United States of America as represented by the Secretary of the Navy
No Drawing. Filed May 26, 1960, Ser. No. 32,051
3 Claims. (Cl. 75—178)

The present invention relates to an aluminum solder and filler alloy and more particularly to an alloy which can be used either to join aluminum parts together or to join dissimilar metals to aluminum in each case without the use of flux.

Thus, in the conventional methods of soldering aluminum a series of some or all of the following steps must be employed in addition to the removal of grease and oils which should be removed prior to any metal joining operation; removal of the oxide film by chemical cleaning or abrasion just prior to the soldering operation, plating the parts, pre-tinning the surfaces to be joined by rubbing or wire-brushing solder on the surfaces, using corrosive fluxes formulated for the particular alloy employed and using ultra-sonic vibrations to remove oxides.

In contrast to the conventional methods if the present aluminum alloy is used all that is required is the usual degreasing operation. Neither plating, pre-tinning or rubbing, flux nor ultra-sonic vibrations are required.

Therefore an object of the present invention is the provision of an alloy of aluminum which may be employed either to join together aluminum parts or to join dissimilar metals to aluminum with no other preparation save the usual degreasing operation.

Another object of the present invention is the provision of an aluminum alloy to solder aluminum by a greatly simplified method.

A further object of the present invention is to provide a soldering alloy for aluminum designed to effectively remove the oxide film from the parts to be joined upon being applied thereto.

The present invention in its optimum composition has the following content: 88% Zn—5% Al—5% Sn—2% Cu. This particular composition has a liquidus of 707° F. and a solidus of 650° F. A ¼" diameter cast piece of this alloy stressed in tension broke at 5000 p.s.i., the break taking place at a void in the specimen. This solder has been used in the following simplified manner. Naturally, all grease and oils should be removed as is the case in any metal joining operation. After heating the parts to be joined to the flow point of the alloy (705° F.), the alloy was simply wiped over the surfaces being joined, the parts were joined and allowed to air cool. No oxide removal was employed; nor was flux, rubbing in of alloy or ultra-sonic vibrating used. As a check, some assemblies were cleaned to remove oxides prior to soldering but the results were the same. Later the assemblies were submitted to test and under shearing action most breakage occurred outside the soldered joint. Stress tests showed a value of 3520 p.s.i. when the parent metal parted. There was no apparent fracture of the joint. The assemblies used in these particular tests were pieces of 2S aluminum ¹⁄₁₆" x ½" x 3" joined in pairs in ½" single lap joints.

This alloy is not, however, limited in its use to joining together aluminum parts since dissimilar metals of all types can be joined to aluminum, providing the melting point of the metals is not below that of the solder. As in the case of joining aluminum parts together no flux need be used nor need oxide or other of the conventional operations be employed. As an example cupro nickel (70 Cu—30 Ni) has been joined to aluminum without difficulty.

This same alloy can also be used as a filler by heating the aluminum casting or machined part to the flow point of the alloy and melting the alloy into the section to be repaired. As with the soldering operation no additional preparatory steps need be taken.

Assemblies of pairs of aluminum strips joined by the alloy of the present invention have been submitted to humidity and salt spray tests with good results. Some corrosion of the solder occurred in only one of the humidity tests but none of the soldered joints came apart.

The effect of heat treatment on the shear strength of the soldered joint was checked. After soldering, specimens were treated for 8 hours at 375° F. before shear testing. The results indicated that heat treatment seems to have little effect on the properties of the soldering alloy.

Other compositions have been tried and tested by the use of visual shear tests conducted by twisting a number of samples of each composition and comparing the extent of twist taking place up to the beginning of the shearing action. Using an alloy of 80% Zn—5% Al—13% Sn—2% Cu composition it was found that the shearing action starts sooner than with the optimum composition discussed above. Also the flow point of this composition is about 100° F. lower than the flow point of the optimum composition. Oxide removal behavior of both compositions is about the same.

In the case of an alloy of composition 80% Zn—7% Al—10% Sn—3% Cu the shearing action starts slightly sooner than in the optimum composition. However, even more important is the fact that the flow point of this composition is higher than that of the optimum composition by approximately 75° F. This is considered detrimental because the higher temperature makes the alloy harder to work with and in the event of too prolonged heating at this temperature there may occur too deep alloying of solder into the component parts with dangerous consequences in the case of thin component parts.

In general it has been found that using less than 80% Zn with varying amounts of the other metals results in an alloy of reduced effectiveness in oxide removal while tinning the parts to be joined.

Another alloy having the composition 88% Zn—2% Al—8% Sn—2% Cu was found to have shear strength slightly lower than the optimum composition and the flow point of this composition is about 50° F. lower. If the copper content is deleted the flow point is lowered still another 50° F. and the shear strength is noticeably lowered.

The following table shows the allowable variations for alloys approaching the optimum:

| Zn | Al | Sn | Cu |
|----|----|----|----|
| 86 | 6  | 6  | 2  |
| 87 | 5  | 6  | 2  |
| 87 | 6  | 5  | 2  |
| 88 | 5  | 5  | 2  |
| 89 | 4  | 5  | 2  |
| 89 | 5  | 4  | 2  |
| 90 | 4  | 4  | 2  |

Although the optimum composition can be varied slightly, the zinc content should not be reduced below 80% and the copper content should be held substantially at 2%.

Obviously many modifications and variations of the present invention are possible in the light of the above teachings. It is therefore to be understood that within the scope of the appended claims the invention may be practiced otherwise than as specifically described.

What is claimed is:

1. An alloy of zinc, aluminum, tin and copper consisting of between 86 and 90 percent zinc, 4 and 6 percent aluminum, 4 and 6 percent tin and about 2% copper, said alloy requiring no flux to join metals to aluminum.

2. An aluminum solder and filler alloy consisting of 88 percent zinc, 5 percent aluminum, 5 percent tin and 2 percent copper.

3. An aluminum solder and filler consisting of over 80 percent zinc, 2 percent copper and the balance being of approximately equal percentages of aluminum and tin.

References Cited in the file of this patent

FOREIGN PATENTS

| | | |
|---|---|---|
| 156,665 | Great Britain | Apr. 14, 1921 |
| 629,425 | Great Britain | Sept. 20, 1949 |